United States Patent [19]

Laughman

[11] 4,210,074

[45] Jul. 1, 1980

[54] CONDIMENT APPLYING APPARATUS ANDMETHOD

[76] Inventor: Clyde R. Laughman, Blittner Ave. & W. Chestnut St., Hanover, Pa. 17331

[21] Appl. No.: 881,376

[22] Filed: Feb. 27, 1978

[51] Int. Cl.² ............................................... A21C 9/04
[52] U.S. Cl. ........................................ 99/494; 118/16; 118/24
[58] Field of Search ................ 99/494, 345; 426/289, 426/292, 296; 118/16, 24, 25

[56] References Cited

U.S. PATENT DOCUMENTS

| | | | |
|---|---|---|---|
| 1,759,608 | 5/1930 | Ehrhart | 118/24 |
| 2,092,836 | 9/1937 | Engels et al. | 118/24 |
| 2,119,910 | 6/1938 | Ferry | 118/24 |
| 2,782,754 | 2/1957 | Bookidis | 118/16 |
| 3,045,640 | 7/1962 | Hill et al. | 118/24 |
| 3,885,519 | 5/1975 | Orlowski | 118/16 |

*Primary Examiner*—Harvey C. Hornsby
*Assistant Examiner*—Timothy F. Simone
*Attorney, Agent, or Firm*—Robert K. Youtie

[57] ABSTRACT

An apparatus and method for applying condiment, say salt to pretzels, wherein the pretzels or other articles are conveyed beneath a condiment dispenser for receiving condiment therefrom on the upper side of the article while condiment passes beneath the article to a collector, and the article is transferred to the collector onto collected condiment for application of the condiment to the under side of the article. The apparatus is selectively operable to apply condiment to only a single side of an article by feeding the article to the collector before deposit of condiment on the collector.

5 Claims, 5 Drawing Figures

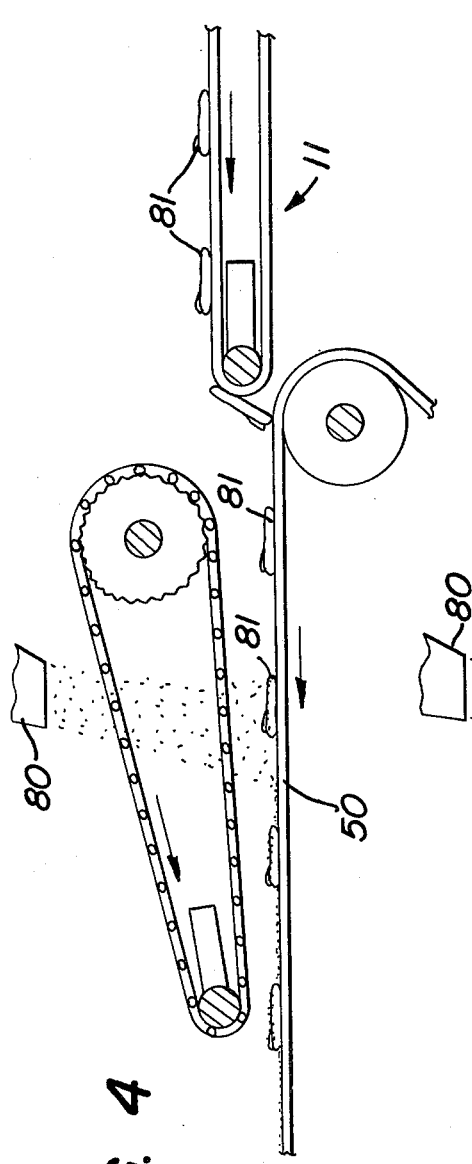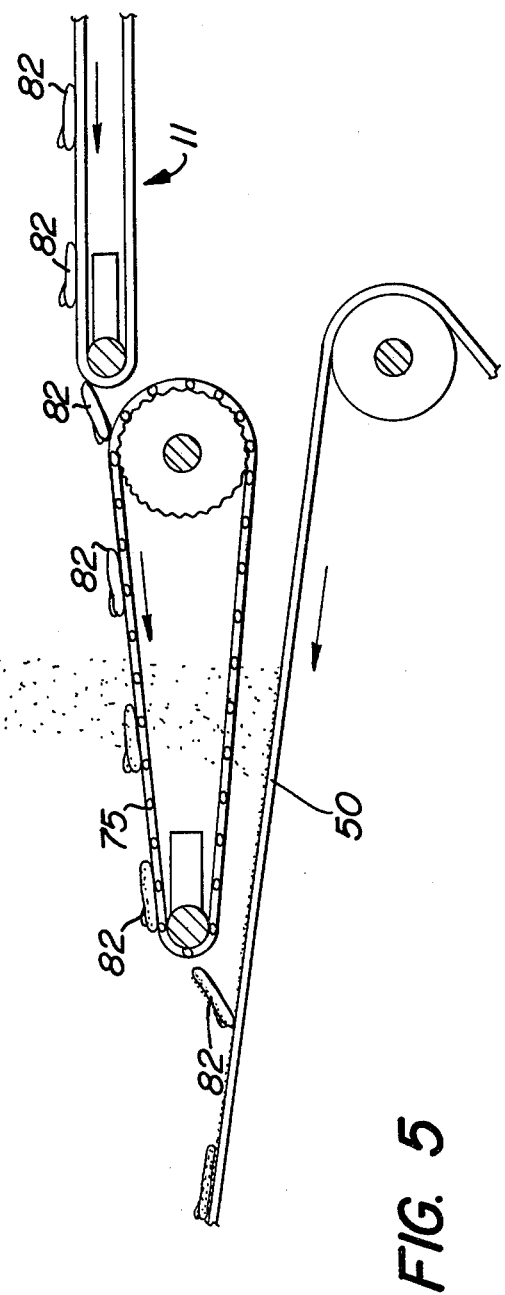
FIG. 4
FIG. 5

CONDIMENT APPLYING APPARATUS AND METHOD

BACKGROUND OF THE INVENTION

As is well known to those versed in food preparation arts, particularly pretzel baking arts, the application of condiment to either one or both sides of the product as desired, heretofore has involved considerable expenditure of time and money, as for alteration or modification of equipment, or utilization of different equipment. For these and other reasons, conventional salting or condiment applying methods and apparatus in the baking industry have not been entirely satisfactory.

SUMMARY OF THE INVENTION

Accordingly, it is an important object of the present invention to provide a unique and highly improved method and apparatus for applying condiment to food products, particularly salt to pretzels, which overcomes the above-mentioned difficulties, enables an operator to almost instantaneously change from one-side salting to both-side salting, and vice versa, which method and apparatus are extremely simple and highly reliable, being substantially foolproof in operation and durable and reliable throughout a long useful life.

It is a further object of the present invention to provide a method and apparatus having the advantageous characteristics mentioned in the preceding paragraph, which is extremely efficient in operation, enables repeated reclaiming and re-use of excess condiment, affords relatively high speed operation, and is well adapted for great versatility in use with a wide variety of forming apparati and baking ovens.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

BRIEF DESCRIPTION OF THE DRAWINGS

FIG. 4 is a fragmentary side elevational view showing the single-side salting operation.

FIG. 5 is a fragmentary side elevational view similar to FIG. 4, but showing double or both side salting operation.

DESCRIPTION OF THE PREFERRED EMBODIMENT

Figure 1:
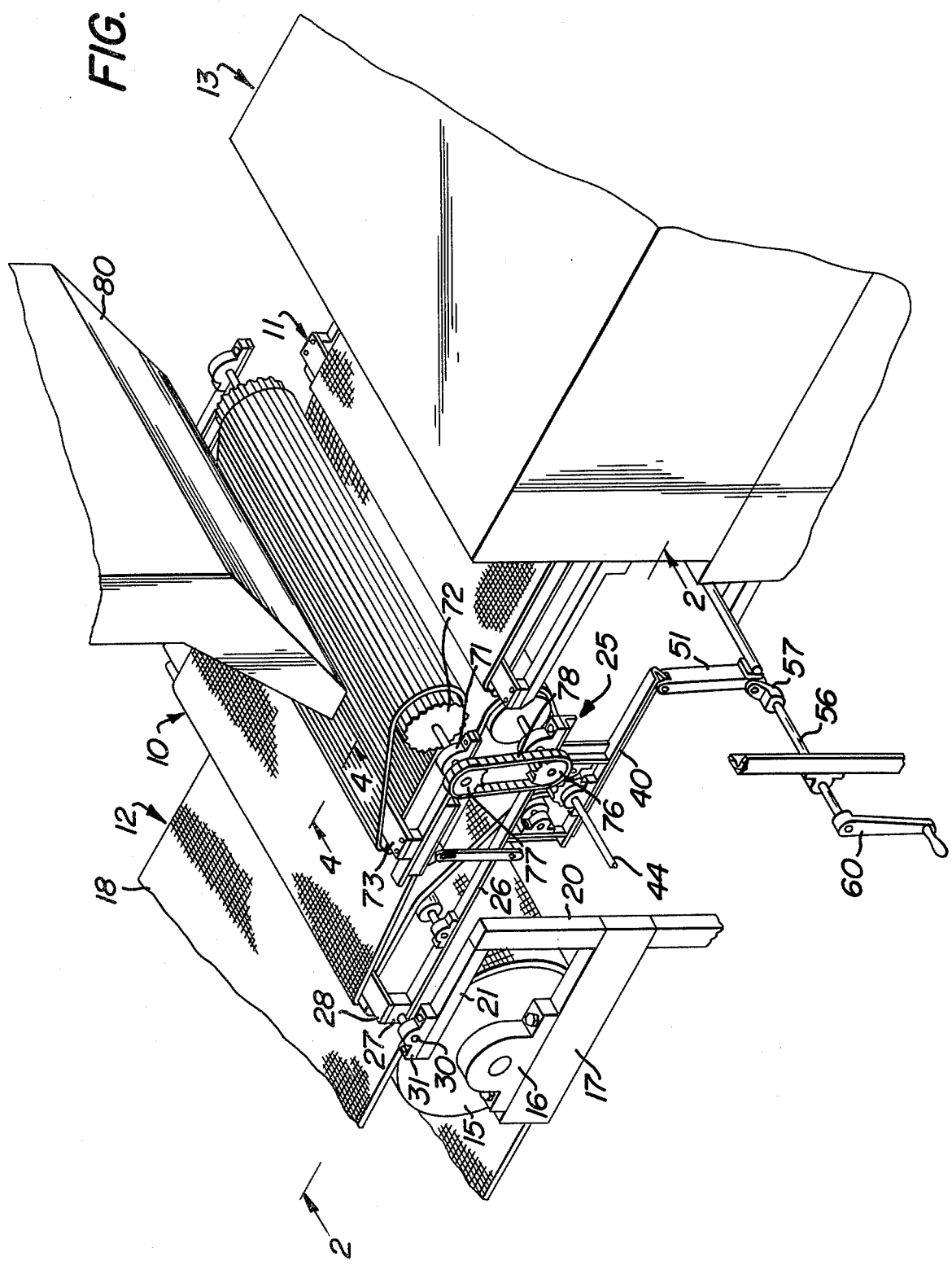
FIG. 1 is a top perspective view showing condiment applying apparatus constructed in accordance with the teachings of the present invention, looking generally downstream.
Figure 2:
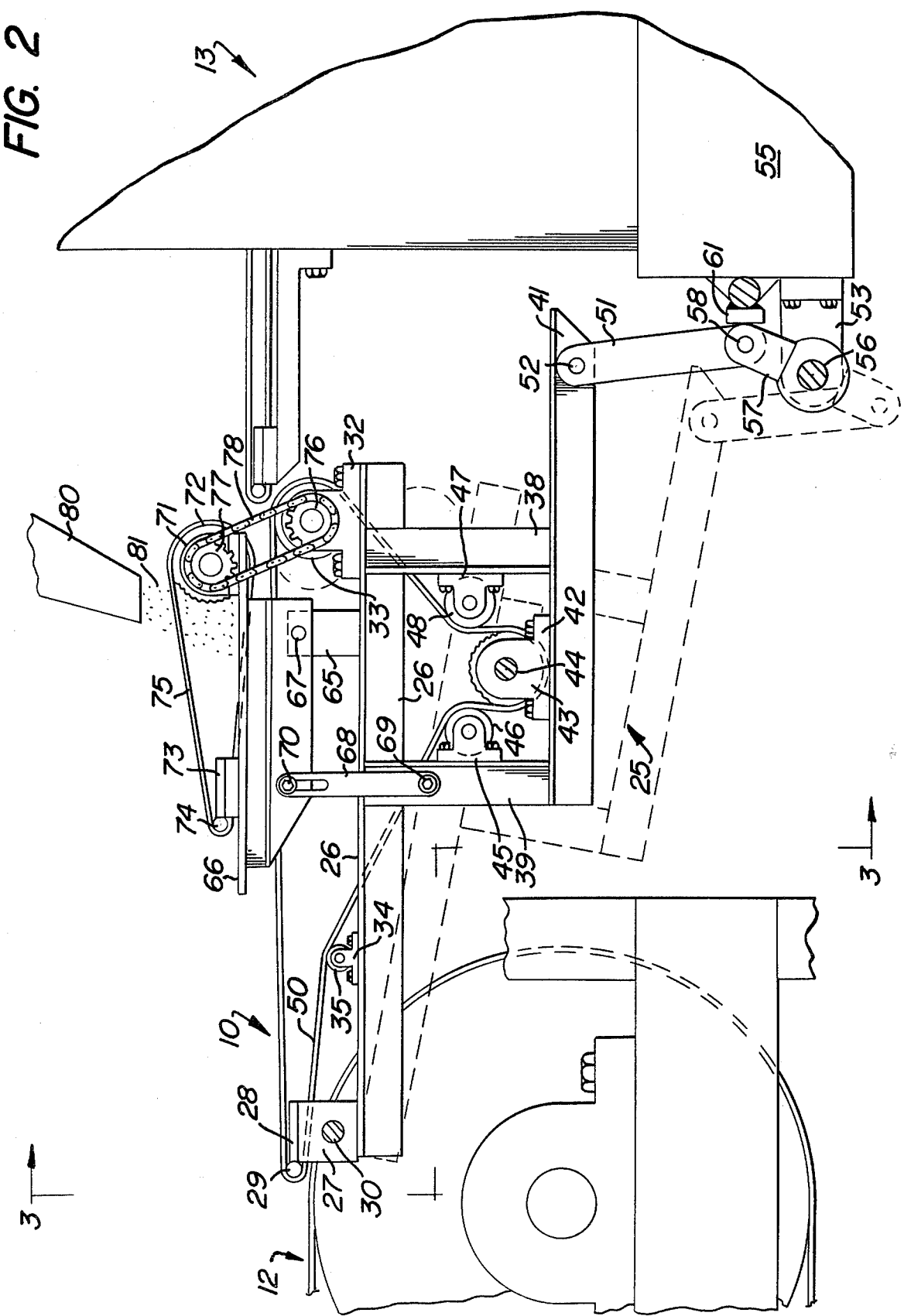
FIG. 2 is a longitudinal sectional elevational view taken generally along the line 2—2 of FIG. 1, showing an alternative position in phantom.
Figure 3:
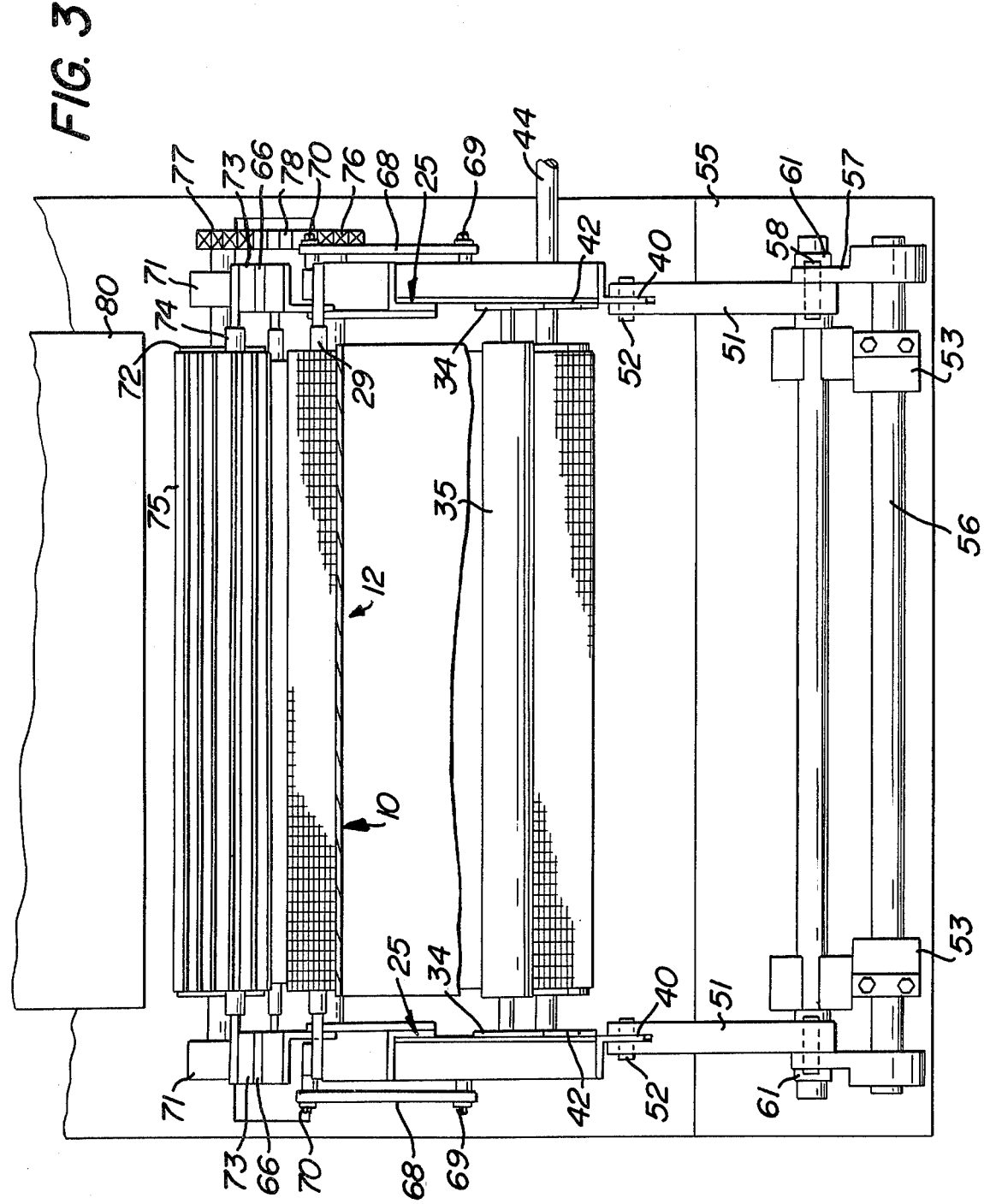
FIG. 3 is a transverse sectional view taken generally along the line 3—3 of FIG. 2.

Referring now more particularly to the drawings, and specifically to FIGS. 1-3 thereof, the condiment applying apparatus is there generally designated 10, being shown operatively located between a feed conveyor 11 and a removal conveyor 12. That is, the condiment applying or salting apparatus 10 is located downstream of the feeding conveyor 11 for receiving articles therefrom, and upstream of the discharge or removal conveyor 12 for discharging salted articles to the latter. The feeding conveyor 11 may be associated with suitable pretzel-forming means 13, such as a conventional extruder or other forming apparatus, and the removal or withdrawal conveyor 12 may be associated with a bake oven (not shown) for passing soft pretzels through the oven to be baked.

The withdrawal conveyor 12 may include an upstream drum 15 extending laterally across the conveyor 12 and journaled at opposite ends by pillow blocks 16 mounted on fixed frame members 17. A mesh belt 18 is trained about the drum or roll 15 and passes therefrom into and out of a baking oven.

Upstanding from the frame members 17 on opposite sides of the discharge conveyor 12 are a pair of fixed columns or posts 20 disposed in laterally opposite relation upstream of the discharge conveyor and each provided with a generally horizontal cantilever beam 21 extending longitudinally downstream toward and terminating proximate to the belt 18.

The condiment applying or salting apparatus 10 may include a generally rigid mounting structure or framework 25 extending laterally between the downstream ends of arms or beams 21, and extending upstream therefrom proximate to the discharge end of feed conveyor 11. The mounting structure or framework may include a pair of laterally spaced, longitudinally extending, generally parallel side pieces 26, each being provided at its forward end with an upstanding block 27, and a lateral bar 28 extends over and across the discharge conveyor belt 18, being fixedly secured between laterally opposed blocks 27. A conveyor belt nose or rod 29 may be fixed to the downstream edge of lateral bar 28, longitudinally thereof for a purpose appearing presently. Stub shafts 30 may project laterally outwardly from respective blocks 27, in alignment with each other, and respectively journaled by pillow blocks 30 each mounted on the adjacent beam 21.

Provided on the upstream ends of longitudinal side pieces 26 are upstanding pillow blocks 32 in which are journaled the opposite ends of a laterally extending roll 33. Intermediate the ends of each side piece 26, in laterally opposed relation, are additional pair of upstanding pillow blocks 34 between which extend an idler roll 35.

Depending from each frame side piece 26, adjacent to the upstream end thereof, are a pair of upstream and downstream frame members 38 and 39, and a lower longitudinal side piece 40 is fixedly secured to and extends between the lower ends of each pair of upstream and downstream frame members 38 and 39, extending upstream therebeyond to an end region 41. Upstanding from each lower side piece 40, intermediate the associated depending frame members 38 and 39 is a pillow block 42, which pillow blocks serve to journal opposite ends of a laterally extending web drive roll 43. That is, the web drive roll 43 is carried on a shaft 44, which is suitably powered by any desired motive means, for purposes appearing more fully hereinafter. Carried by each downstream depending frame member 39, intermediate its ends and on the upstream side thereof is a pillow block 45, and an idler roll 46 extends laterally between and has its opposite ends journaled in respective pillow blocks 45. Similarly, each depending frame member 38 intermediate its ends and on the downstream side thereof is provided with an outstanding pillow block 47, between which extend an idler roll 48 having its opposite ends journaled in respective pillow blocks 47. A conveyor belt or web 50 is trained exteriorly about the drive roll 43, upper, upstream roll 33 and nose or rod 29, being interiorly of and in rolling engagement with idler rolls 35, 46 and 48. The belt or web 50 may be of a flexible, reticulate material, say metal mesh, or other suitable material capable of the desired flexibility, durability, heat resistance, and the like. An important and essential characteristic of belt or web 50 is the ability to support and collect particulate material, such as salt or other condiment, with little or no passage through the belt of the particulate material. As best seen in FIG. 2, the external surface of drive roll 43 is effectively maintained in driving engagement with the belt 50 throughout a substantial arc of the driving roll by location of the idler rolls 46 and 48; and further, the idler roll 35 assures passage of the belt 50 about rod 29 with a relatively small radius of curvature, so that the discharge or delivery end of conveyor 10 may be proximate to withdrawal conveyor 12 for effective delivery to the latter, as will appear presently. Of course, adjustability may be afforded to one or more of the rolls 33, 35, 43, 46 and 48 for proper tautness of belt 50.

The upstream end of each lower side piece 40 is provided with a depending link 51 pivotally connected at its upper end by a pin 52 to the adjacent rear frame member end portion 41. A journal bracket 53 projects from a fixed structure 55 and rotatably supports a laterally extending crank shaft 56. The crank shaft 56 is provided with a pair of crank arms 57 each having its outer end pivotally connected, as by a pin 58, to the lower end of a respective link 51, and a crank operator or handle 60 is carried on the outer end of the crank shaft 56. Thus, the crank shaft 56 is rotatable by rotation of the handle 60 to a limiting position shown in solid lines in FIG. 2 with the crank arm 57 in limiting abutting engagement with a fixed stop 61, and is rotatable counter clockwise as seen in FIG. 2 to the phantom position in which the framework 25 is shifted downwardly about the axis of shafts 30.

Upstanding from each side piece 26, just downstream of the adjacent journal bearing 32, is a rigid frame member 65, and an upper longitudinally extending side piece 66 is pivotally connected, as by pin 67, to the upper end of each frame member 65 and extends downstream therefrom, over the adjacent longitudinal side piece 26. Downstream of each upstanding frame member 65, there is provided a link 68 having its lower end connected to the adjacent depending frame member 39, as by pin 69, and its upper end extending above the side piece 26 and connected to a downstream region of upper side piece 66 by an adjustable pin-in-slot connection 70. On the upstream end of each upper side piece 66 may be an upstanding pillow block 71, between which pillow blocks there extends a rotatable, upstream roll 72. Extending laterally between and rigidly connected to downstream end regions of upper side piece 66 may be a bar 73, which may be provided on its downstream edge with a laterally extending nose piece or rod 74. An endless belt or web 75 is trained about the upstream roll 72 and downstream rod 74, being of flexible, open reticulation construction, as by spaced metal rods for endless rotation exteriorly about the roll 72 and rod 74 upon rotation of the roll. It will be observed that the upstream end of conveyor belt 75 is downstream of the upstream end of conveyor belt 50, while the downstream end of conveyor belt 75 is upstream of the downstream end of conveyor belt 50. The upstream rolls 33 and 72 of belts 50 and 75, respectively, may be provided with suitable drive means, such as sprocket wheels 76 and 77, about which is trained a sprocket chain 78. Thus, the belts 50 and 75 are simultaneously rotated in the counter clockwise direction, as seen in FIG. 2.

If desired, additional bracing may be afforded to the mounting structure or framework 25, as by suitable struts, or the like.

Located over the upper, open work conveyor of belt 75, downstream of the upstream roll 72, may be a gravitational dispenser 80, for dispensing particulate or granular material, such as salt or similar condiment. The particulate material is indicated at 81 as passing gravitationally through the upper belt 75, between the upstream and downstream ends thereof, and being gravitationally deposited on the lower belt 50, where it is collected for discharge at the downstream end and suitable recovery, as desired.

In the solid line position of FIG. 2, corresponding to the position shown in FIG. 4, the conveyor belt 50 has its upstream end in receiving relation with the downstream end of feed conveyor 11. Shown in FIG. 4 are formed articles 81, such as pretzels being delivered from feed conveyor 11 to the upper run of conveyor belt 50. The articles 81 are delivered to the conveyor belt 50 at a location upstream of the condiment dispenser, and so lay on the upper run of belt 50 before condiment is applied to the belt. Upon passage of the articles 81 beneath the condiment dispenser 80, the condiment is gravitationally applied to the upper surface of the articles, which proceed in this condition to the oven belt 12. That is, the articles 81 are salted on one side only in the operation shown in FIG. 4.

Upon operation of crank 60 to swing the mounting structure 25 downwardly about pivots 30, there is assumed the condition shown in FIG. 5. It will there be noted that the conveyor belt 75 is located with its upstream end proximate to the downstream end of feed conveyor 11 for receiving articles 82 from the feed conveyor. Thus, the articles 82 pass to the upper run of open work conveyor belt 75, beneath the condiment dispenser 80, whereupon the upper sides of the several articles 82 are condimented or salted. Simultaneously, the particulate condiment passes through an intermediate region of conveyor belt 75 on to collector conveyor belt 50, and at a location downstream of the dispenser 80 the top condimented articles 82 are delivered to the upper run of web 50 without inversion of the articles, so as to rest with their undersides on the condiment and thereby receive the latter applied to the articles. In this manner, both sides of pretzels or other articles 82 may be salted or otherwise condimented, and delivered in their plastic condition to an oven for baking.

From the foregoing, it will now be understood that the instant invention provides an extremely simple and highly efficient method and apparatus for selectively condimenting one or both sides of food product, as desired, with a substantially instantaneous shift there between, that lost condiment is reduced to a minimum, and that the invention otherwise fully accomplishes its intended objects.

Although the present invention has been described in some detail by way of illustration and example for purposes of clarity of understanding, it is understood that certain changes and modifications may be made within the spirit of the invention.

What is claimed is:

1. Condiment applying apparatus comprising a first conveyor for feeding articles to be condimented, a condiment dispenser downstream of said first conveyor for gravitationally dispensing condiment, a second conveyor downstream of said first conveyor beneath said condiment dispenser positioned with its upstream end adjacent to the discharge end of said first conveyor for receiving articles directly without inversion from said first conveyor and conveying the articles without inversion beneath said dispenser for application of condiment to the upper side of the articles and collection of condiment on said second conveyor, a third conveyor interposed beneath said dispenser and over said second conveyor and of an open-work construction for direct gravitational falling therethrough of the condiment onto said second conveyor, and mounting means mounting said second and third conveyors for movement shifting said third conveyor to a position with its upstream end adjacent to the discharge end of said first conveyor for receiving articles directly without inversion from said first conveyor with the articles receiving condiment directly from said condiment dispenser on their upper side said condiment passing from said articles and said dispenser through said third conveyor to be collected on said second conveyor and said second conveyor being shifted to a position directly receiving the articles from the third conveyor without inversion said articles having condiment applied to its underside from said condiment collected on said conveyor, so that condiment is selectively applied to one or both sides of the articles.

2. Condiment applying apparatus according to claim 1, said second conveyor being relatively impervious to granular condiment.

3. Condiment applying apparatus according to claim 1, said third conveyor being in nonconveying relation with said first and second conveyors when said second conveyor is positioned for receiving articles from said first conveyor.

4. Condiment applying apparatus according to claim 1, said mounting means mounting both said second and third conveyors for movement together in fixed relation with each other upwardly to position said second conveyor for receiving articles from said first conveyor and downwardly to position said third conveyor to receive articles from said first conveyor.

5. Condiment applying apparatus according to claim 4, said mounting means being pivoted.

* * * * *